J. PALLEY.
CAR AXLE.
APPLICATION FILED MAY 27, 1916.
1,206,583.
Patented Nov. 28, 1916.
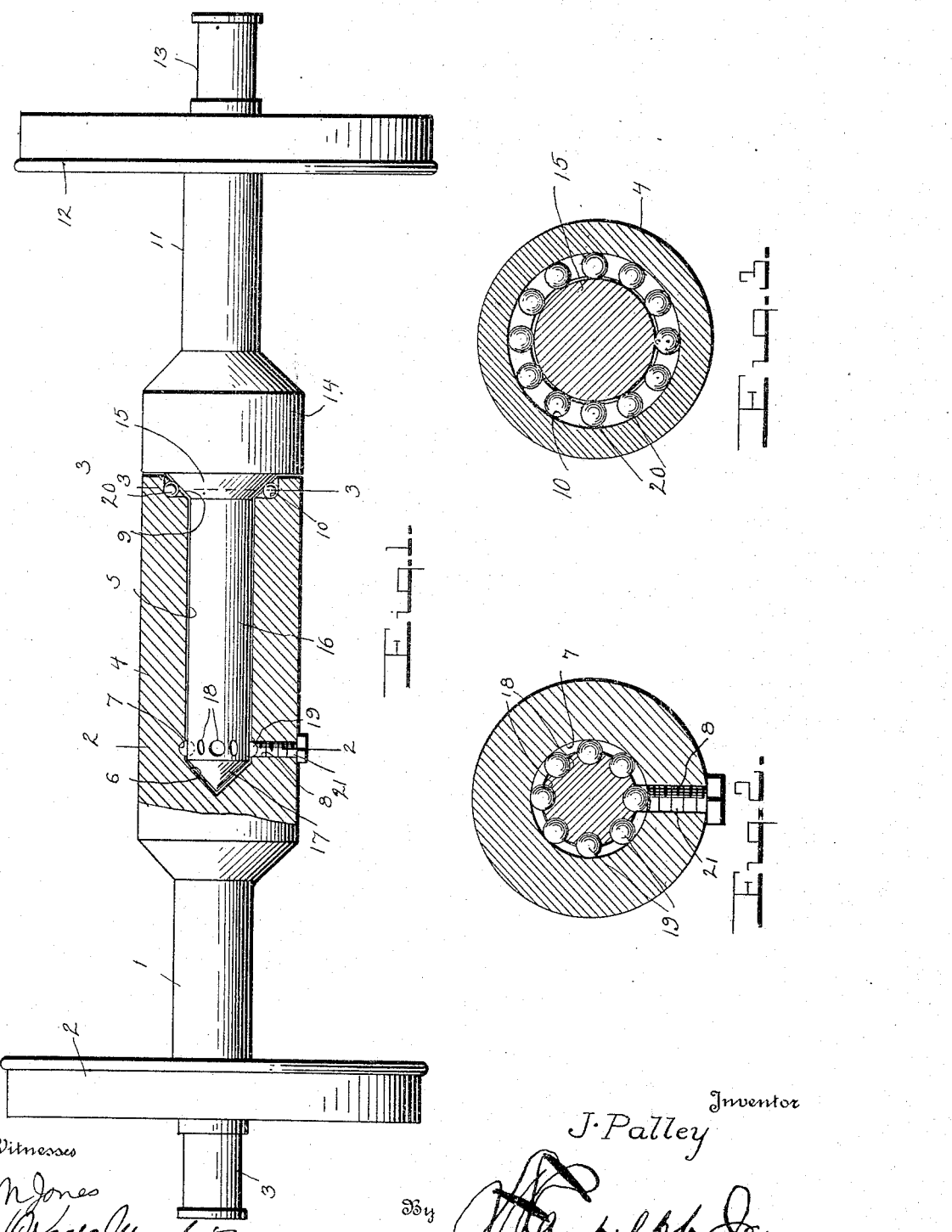
Witnesses
R. N. Jones
Inventor
J. Palley
By
Attorney
THE NORRIS PETERS CO., PHOTO-LITHO., WASHINGTON, D. C.

UNITED STATES PATENT OFFICE.

JOHN PALLEY, OF SPRINGVALLEY, ILLINOIS.

CAR-AXLE.

1,206,583.   Specification of Letters Patent.   Patented Nov. 28, 1916.

Application filed May 27, 1916. Serial No. 100,240.

*To all whom it may concern:*

Be it known that I, JOHN PALLEY, a citizen of the United States, residing at Springvalley, in the county of Bureau and State of Illinois, have invented certain new and useful Improvements in Car-Axles; and I do hereby declare the following to be a full, clear, and exact description of the invention, such as will enable others skilled in the art to which it appertains to make and use the same.

This invention relates to new and useful improvements in car axles and is particularly adapted for use in connection with railway cars of the ordinary type to enable the wheels of the cars to turn independently.

Another object of the invention is to provide an axle formed of two separate sections which are rotatably mounted with relation to each other and provided with ball bearings at their point of connection in order to reduce the friction to a minimum.

With these and other objects in view the invention consists in the novel combination and arrangement of parts which will be fully set forth in the following specification and accompanying drawing, in which:—

Figure 1 is a view partly in section of an axle constructed in accordance with this invention, Fig. 2 is a transversely sectional view through Fig. 1 taken on the line 2—2 thereof, and Fig. 3 is a transverse sectional view taken on line 3—3 of Fig. 1.

Referring to the drawing the numeral 1 designates one section of the axle carrying the usual wheel 2 and provided with the ordinary reduced portion 3 which is positioned on the outer side of the wheel and adapted to rest in the journal bearing of the car. The section 1 is provided at its inner end with an enlarged portion 4 formed with the axial bore 5 which extends thereinto from the inner end and this bore terminates in the tapered recess 6. Formed adjacent the tapered recess of the bore 5 is an annular groove 7 forming a ball race in which the inner ball bearings to be more fully hereinafter described run. An internally threaded opening 8 extends transversely through the enlargement 4 and communicates at its inner end with the ball race 7 as clearly illustrated in Fig. 1. The outer end of the bore 5 is countersunk as at 9 and this countersunk portion is provided with an annular groove 10 forming a ball race for the reception of the bearings at the outer end of the bore 5.

The coöperating section of the axle is designated by the numeral 11 and carries the usual wheel 12 and this section 11 is provided with the reduced portion 13 which is adapted to fit in the journal bearing on the car opposite the bearing which receives the extension 3. A suitable enlargement 14 is formed at the opposite end of the section 11 and is provided with the reduced frusto-conical portion 15 which terminates at its outer end in the cylindrical extension 16. The frusto-conical portion 15 is adapted to fit in the counter-sink 9 and bear against the ball bearings positioned within the annular groove 10 as will be seen upon reference to Fig. 1. The reduced cylindrical portion 16 is provided with the conical end 17 and adjacent said end are provided a plurality of recesses or pockets 18 for the reception of the bearing balls 19 which run in the race 7. The bearing balls 19 coöperate with the bearing balls 20 positioned in the annular race 10 and it will thus be seen that the axle sections 1 and 11 will be independently rotatable with relation to each other.

In assembling the device, the balls 20 are placed in the ball race 10 and the sections 1 and 11 are assembled as illustrated in the drawing. The balls 19 are then dropped into their respective pockets 18 through the opening 8 and after they have been placed in position the set screw 21 is threaded into the opening and it will be apparent that the two axle sections cannot be separated.

While in the foregoing there has been shown and described the preferred embodiment of this invention, it is to be understood that such changes may be made in the combination and arrangement of parts as will fall within the spirit and scope of the appended claims.

What is claimed is:—

1. In a car axle, a pair of axle sections, an enlargement on the inner end of one of said sections, said enlargement being provided with an axial bore, an extension on the inner end of the opposite section adapted to fit in the bore of the enlargement, ball bearings positioned between the enlargement and the second axle section, the enlargement being provided with an internal annular groove, the extension being provided with a plurality of pockets arranged in alinement with the groove, and bearing balls positioned in the pockets and fitting into the groove to prevent the axle sections from being separated and to provide a frictionless bearing.

2. A car axle comprising a pair of axle sections, an enlargement on one of said axle sections, said enlargement being provided with an axial bore and having a groove formed near the inner end of the bore, said groove providing an annular ball race, the enlargement also having a radial opening communicating with the groove, an enlargement at the inner end of the coöperating axle section, a frusto-conical bearing element formed at the inner end of the enlargement, the first mentioned enlargement having an annular groove near its inner end forming a ball race, balls positioned in said groove and bearing on the frusto-conical bearing element, a cylindrical extension formed at the outer end of the element and projecting into the axial bore in the first mentioned enlargement, the inner end of said extension being provided with an annular row of ball bearing receiving pockets, bearing balls positioned in the pockets and projecting into the inner groove to prevent relative lateral movement of the axle sections with relation to each other and a screw positioned in the opening to prevent the balls from being accidentally removed.

In testimony whereof I affix my signature in presence of two witnesses.

JOHN PALLEY.

Witnesses:
ANTON MUSSATTI,
CHARLEY ALIA.

Copies of this patent may be obtained for five cents each, by addressing the "Commissioner of Patents, Washington, D. C."